H. J. MARK & W. F. MARTINEK,

Assignors to MARK AND MARTINEK MANUFACTURING COMPANY.

BOTTLE WRAPPER.

No. 10,069. Reissued Apr. 4, 1882.

ATTEST:

E. F. Andrews.

A. U. Hoig.

INVENTORS.

Henry J. Mark

William F. Martinek.

per Robert, Burns attorney.

UNITED STATES PATENT OFFICE.

HENRY J. MARK AND WILLIAM F. MARTINEK, OF ST. LOUIS, MISSOURI, ASSIGNORS TO MARK AND MARTINEK MANUFACTURING COMPANY, OF SAME PLACE.

BOTTLE-WRAPPER.

SPECIFICATION forming part of Reissued Letters Patent No. 10,069, dated April 4, 1882.

Original No. 230,710, dated August 3, 1880. Application for reissue filed February 3, 1882.

*To all whom it may concern:*

Be it known that we, HENRY J. MARK and WILLIAM F. MARTINEK, citizens of the United States, and residents of the city of St. Louis, in the State of Missouri, have invented certain new and useful Improvements in Bottle-Wrappers; and we do hereby declare that the following is a full, clear, and exact description of the same, reference being had to the accompanying drawings, forming a part of this specification.

This invention relates to improvements in wrappers for bottles and other analogous articles, designed to prevent the same from breaking when packed or stored; and the invention consists, first, of a bottle-wrapper composed of a thin corrugated veneer of wood, cut direct from the veneer block, so that its corrugations will cross the grain of the wood, as will hereinafter more fully appear; second, in arranging the corrugations of a bottle-wrapper in a spiral or diagonal line, as will hereinafter more fully appear.

Figure 1:
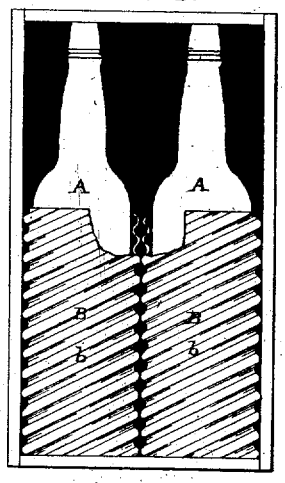
Figure 2:
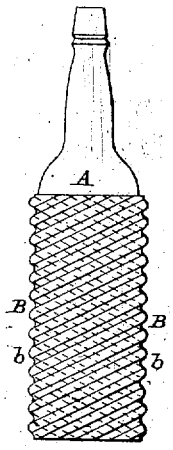
Figure 3:
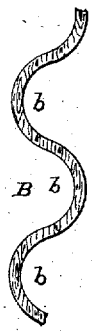

In the drawings, Figure 1 is a side view of two bottles packed in a box with our wrappers, a portion of the wrappers being broken away to show the space formed between the bottles by the use of our improved wrappers. Fig. 2 is a view of a single bottle and wrapper, showing in dotted lines how the corrugations of one wrapper cross the corrugations of the next adjacent one, to give double space between the bottles, instead of allowing the corrugations to mesh one with the other. Fig. 3 is an enlarged detail section of our improved corrugated wood bottle-wrapper.

In the drawings, A represents a bottle provided with our improved wrapper, B, formed of a thin veneer of wood, corrugated. The corrugations *b* are formed in the veneer direct when cutting it from the block, so that the corrugations will cross the grain of the wood, in manner clearly indicated in Fig. 3 of drawings. By this means a permanent and elastic corrugation is formed in the wrapper, and the liability of the corrugations flattening out in use is entirely overcome with the present construction.

For affording greater elasticity to the wrapper than has heretofore been accomplished in a practical manner, we arrange the corrugations *b* in a spiral or diagonal direction, as indicated in the drawings, so that the fiber of the wood in the cut corrugations aforesaid will be longer, and consequently more elastic, and at the same time stronger; and, further, when the bottles or other articles are packed in close adjacent position the inclination of the corrugations on one bottle-wrapper is reverse to the inclination of the corrugations on the other, and the corrugations thus cross each other, as indicated in dotted lines in Fig. 2. The bottles are really separated by a distance equal to twice the height of the corrugations, (see Fig. 1,) thus affording between the bottles double the elasticity that the single corrugations of any one wrapper present.

The feature of the diagonally or spirally arranged corrugations may be applied to other forms of bottle-wrappers, and in some cases be made in the form of a series of separate but closely-spaced indentations, punctures, or perforations, without departing from the spirit of our invention.

Having thus fully described our said invention, what we claim as new, and desire to secure by Letters Patent, is—

1. A wrapper for bottles, &c., made of a veneer of wood having corrugations cut across the grain of the wood, substantially as described.

2. A wrapper for bottles, &c., having spiral or diagonally-arranged corrugations, substantially as described.

In testimony whereof witness our hands this 20th day of January, 1882, at the city of St. Louis, State of Missouri.

HENRY J. MARK.
WILLIAM F. MARTINEK.

In presence of—
ROBERT BURNS,
J. McD. STUART.